July 21, 1931.  J. W. BLOUNT  1,815,138
PISTON RING
Filed Feb. 14, 1930
Fig. 1.
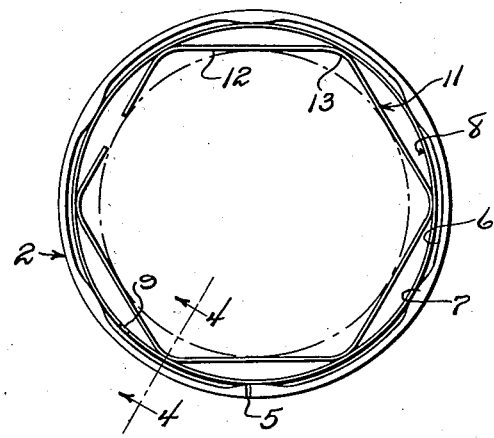
Fig. 2.
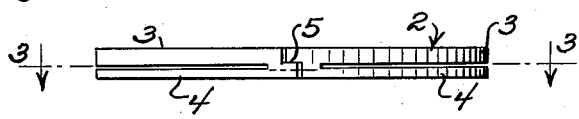
Fig. 3.
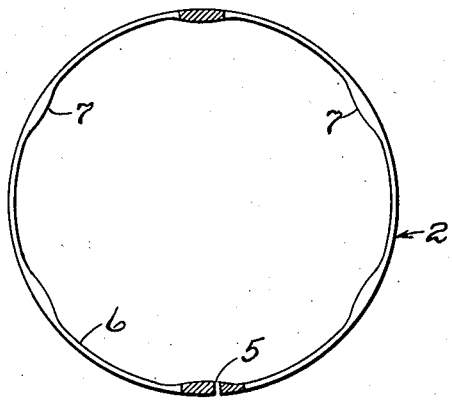
Fig. 4.
Fig. 5.
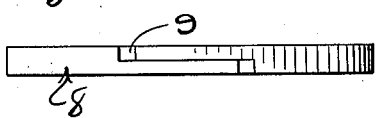
John W. Blount
INVENTOR
BY Victor J. Evans
ATTORNEY Patented July 21, 1931

1,815,138

UNITED STATES PATENT OFFICE

JOHN W. BLOUNT, OF PITTSBURGH, PENNSYLVANIA

PISTON RING

Application filed February 14, 1930. Serial No. 428,451.

This invention relates to new and useful improvements in piston rings and has for its primary object the provision of means for retaining an expansion ring to prevent the accidental escape thereof from the piston groove at any time and especially in case the expansion ring breaks during use and thereby obviate any possibility of scoring the cylinder of an engine from such an accident.

Another object of this invention is the provision of the expansion ring so shaped that it will have contact with the piston ring and the wall of the groove of the piston at spaced intervals to cause the piston ring to more efficiently contact with the wall of the cylinder and cooperate with the retaining means or ring in preventing the escape of any part thereof in case of accidental breakage during use of the device.

A further object of this invention is the provision of spaced shoulders or thickened portions to the piston ring to provide more flexibility to the piston ring and which provides means whereby the piston ring may always be made to standard sizes and when desiring to construct oversize rings it is only necessary to increase the size of the shoulders or thickened portions.

A still further object of this invention is to provide a piston ring of the above stated character which shall be simple, durable and efficient, and which may be manufactured and sold at comparatively low cost.

With these and other objects in view, as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which:

Figure 1 is a plan view illustrating a piston ring constructed in accordance with my invention.

Figure 2 is a side elevation illustrating the same.

Figure 3 is a sectional view taken on the line 3—3 of Figure 2.

Figure 4 is a sectional view taken on the line 4—4 of Figure 1.

Figure 5 is a side elevation, illustrating the protecting ring.

Referring in detail to the drawings, the numeral 1 indicates a piston of any well known construction having the usual piston ring groove and to which my invention is applied. A piston ring 2 includes an annular body 3, with an annular groove 4 in its outer face and the body 3 of the piston ring is split and cut away to form overlapping shoulders 5 which permit the body 3 of the ring 2 to expand and contract but still maintain a leak-proof connection between the ends of the ring. If desired the outer face of the ring may be made solid by eliminating the groove 4, and finished, and faced over all. The inner face of the body 3 is cut away at spaced intervals as shown at 6 to form relatively spaced thickened portions or shoulders 7 adapted to render the body of the ring with an increased amount of flexibility over the ordinary type of ring which is of the same thickness throughout.

A retaining ring or band 8 constructed from steel or any other flexible material and preferably slit as shown at 9 to engage the inner face of the piston ring 2 and bear against the shoulders or thickened portions as shown in Figure 1 and is adapted to protect and retain within the groove of the piston an expansion ring 11 and to prevent any part of the expansion ring from escaping from the groove of the piston when broken, consequently obviating any possibility of the cylinder of an engine becoming scored from such an accident. The expansion ring 11 is bent to form substantially straight piston engaging portions 12 and relatively spaced piston ring engaging portions or shoulders 13, consequently providing an expansion ring of considerable expansion and contraction and one containing a large amount of flexibility. It is to be understood that the portions 12 of the expansion ring engage the inner wall of the groove of the piston while the shoulder portions 13 bear against the inner face of the protecting ring 8 causing the same to expand against the piston ring 2 and force the same into tight engagement with the wall of the cylinder of an engine thereby establishing a leak-proof connection between the piston and the wall of the cylinder and which will prevent undue slapping or lateral movement of the piston in the cylinder during the reciprocatory motion of the piston.

It is to be understood that the protecting ring or element 8 can be used in conjunction with any well known type of ring expander and piston ring and will efficiently retain the expanding ring in the groove of the piston in case the expanding ring is broken during use and also will efficiently transmit the pressure of the expansion ring to the piston ring.

My piston ring is in one piece and slotted in line thickness of the ring and is made according to the depth of the groove in the piston. The piston ring being cut away at spaced intervals on the inner face thereof renders the ring more flexible so that the expanding ring can more easily place the proper tension on the piston ring and against the walls of the cylinder.

The shoulders or thickened portions 7 besides giving the piston ring additional flexibility over ordinary piston rings, will also provide means whereby the piston rings may be made to standard sizes and when it is desired to construct rings of over sizes the thickness of the ring is made to a suitable depth.

The ring will give a motor more power and less fuel consumption, and is especially good for worn cylinders by reconditioning them, eliminating grinding or honing of the block and permitting the same old pistons to be used.

While I have shown and described the preferred embodiment of my invention it will be understood that minor changes in construction, combination and arrangement of parts may be made without departing from the spirit and scope of the invention as claimed.

Having thus described my invention, what I claim is:

A piston ring comprising a split annular member having overlapped ends and positioned in the grove of a piston, relatively spaced shoulders formed on the inner face of the member, a retaining ring engaging the shoulders, and an expansion ring including relatively spaced shoulder portions and substantially straight portions and positioned in the groove of the piston between the inner wall thereof and the retaining ring with the shoulder portions engaging the expansion ring between the shoulders of the annular member and having the substantially straight portions contacting with the inner wall of the groove of the piston.

In testimony whereof I affix my signature.

JOHN W. BLOUNT.